RE 24 660
Oct. 21, 1958     J. T. DESSUREAU ET AL     2,856,914
STONE SAWING WIRE
Filed July 22, 1957
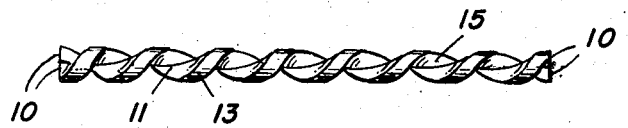
FIG. 1
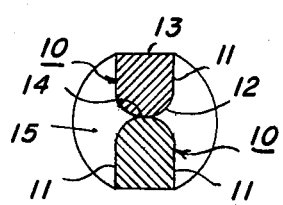
FIG. 2
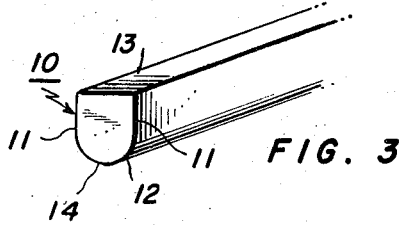
FIG. 3
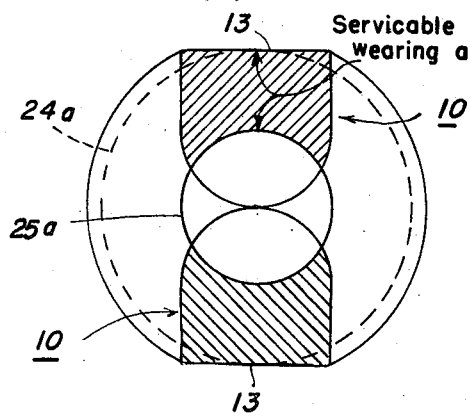
FIG. 4
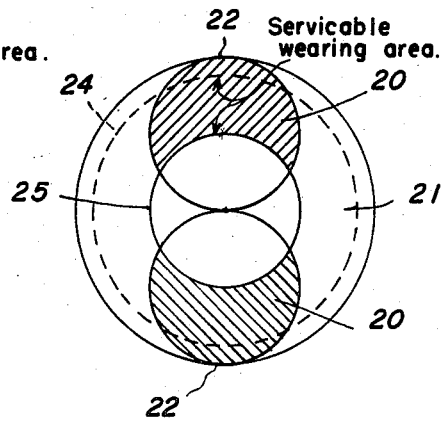
FIG. 9
FIG. 5
FIG. 7
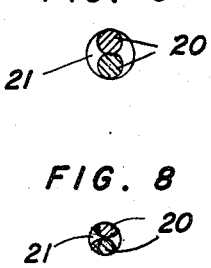
FIG. 6 / FIG. 8
INVENTORS
JOSEPH T. DESSUREAU &
JOHN B. DESSUREAU
BY *N. J. Willson & Co.*
ATTORNEYS Patented Oct. 21, 1958

2,856,914

STONE SAWING WIRE

Joseph Theodore Dessureau and John B. Dessureau, Barre, Vt.

Application July 22, 1957, Serial No. 673,226

1 Claim. (Cl. 125—21)

This invention relates to endless wire saws for stone cutting machines.

Stone cutting or sawing machines are now being extensively used to cut blocks of granite, marble and other stone by means of one or more endless abrasive wires or cables which pass over large pulleys on a carriage usually fed downwardly as the cut is made. To the cutting stretch of the wire saw is fed water and an abrasive material such as emery. These saws are usually composed of two or more strands of wire of hard drawn abrasive resistant steel or an alloy, that are twisted so that spiral channels or grooves are formed by the strands along the cable to carry the abrasive.

We have found that the fastest and most effective cutting action of the saw on the stone takes place when the outer peripheral areas of the strands that might contact the stone is large and the spiral channels between the strands are sufficiently large in cross section to effectively carry the abrasive along the cut and feed the grit between such outer areas and the stone. The most extensively used cutting cables are formed of either two or three strands of round wire spirally twisted. When two round strands are used, the abrasive carrying channels are large but until the outer peripheral portions of the strands have been worn down to form larger wearing areas the cutting action of the cable is very slow. When the cable is composed of three round strands, the capacity of the abrasive carrying channels is substantially less, and before the serviceable wearing areas of the strands have been consumed the channels are too small to carry the abrasive along the cut and feed it between the stone and the outer peripheral areas of the strands.

In the type of fast sawing being done in the stone industry at the present time, on hard stone such as granite and marble, these cutting cables travel at a speed of about 4,500 feet per minute over pulleys or sheaves having a diameter of a few feet. Due to the rapid flexing of the cables it is, practically speaking, necessary to make them with a diameter of not more than ¼ of an inch in order to prevent rapid crystallization of the metal of the strands. It is also important that the cables retain their tensile strength throughout their cutting life.

One object of the invention is to provide a stone sawing wire which has a considerably longer wearing life than the now known and used cables and which will cut effectively at the beginning of its use and continue to cut at substantially the same rate until it is worn out, with the result that substantially more stone is cut per foot of wire.

Another object is to provide a stone sawing cable which not only has the above stated long and uniform fast cutting life but which also is easy to twist, will retain its twisted shape and will have sufficient tensile strength throughout its useful life.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a side view of a portion of our improved stone sawing wire or cable;

Fig. 2 is a cross sectional view on an enlarged scale;

Fig. 3 is a perspective view of an end portion of one of the two strands from which the cable is made;

Fig. 4 is a diagrammatic sectional view similar to Fig. 2 on a further enlarged scale;

Fig. 5 is a view of a portion of the old two strand cable made of round wires;

Fig. 6 is a cross section of Fig. 5;

Fig. 7 is a view showing the two strand round wire cable of Fig. 5 after it has been worn out; and Fig. 8 is a cross section of Fig. 7.

The above stated objects of the invention are attained by making our improved cable of two strands of wire the cross sectional shape of which is half-round and half-square, the strands being spirally twisted together so that the central longitudinal portions of the half-round inner sides or faces of the two strands are in contact at the center of the cable and the square sides or faces form the outer peripheral portion of the cable. In the drawings the strands are designated generally by the numeral 10, and as seen in Fig. 3, each has flat parallel side walls 11 the inner portions of which merge into the half-round or semi-circular inner wall or face 12, and the outer portions of which terminate at the edges of the outer flat wall or face 13 to form the half-square outer peripheral parts of the cable. While the outer wall 13 may be tangent to the circle struck on the radius of the curved inner wall 12, it is preferably spaced slightly away from that circle to provide a slightly greater amount of serviceable wearing material at the outer peripheral portion of the cable. That outer wall or face 13 is shown as flat, but it may be slightly convex or concave crosswise of the strand. The preferred diameter of the cable formed by the two twisted strands is ¼ of an inch so that the parallel side walls 11 of each strand are ⅛ of an inch apart and the radius of the half-round portion 12 is 1/16 of an inch. When the two strands are twisted together the central points 14 of the curved or half-round inner sides of the two strands contact along the longitudinal axis of the cable; as seen in Fig. 2. That forms along the opposite sides of the strands spiral channels or grooves 15 which are large in cross sectional area and which extend inwardly to the axis of the cable. Thus the channels or spaces 15 have large abrasive carrying capacity and permit of the use of coarser abrasive grains for more economical operation of the saw. It is to be noted that the two strands have the same cross sectional shape and area, and since the wear is only at the peripheral portion of the cable, the tensile strength of one strand will continue to be equal to that of the other throughout the useful life of the cable.

The old two strand round wire cable has been shown in Figs. 5 through 9 to bring out the differences between it and our improved cable. In those views of the drawings the round strands are designated 20 and abrasive carrying channels 21. As indicated in the enlarged and diagrammatic view Fig. 9, when such a cable is first put into use the outermost surfaces of the strands contact with the stone at single points designated 22 because the strands are round. No effective cutting is done until the strands wear down to the dotted line circle 24 in Fig. 9. By the time the strands 20 have been worn down to the inner circle 25 the abrasive carrying channels 21 become so small (the portions of 21 within the circle 25) that the cable ceases to cut effectively and must be discarded. That worn out condition of the cable is shown in Figs. 7 and 8. Hence the really serviceable wearing area of each strand is the portion between the circles 24 and 25, and it is designated by the arrowed lead lines and the legend "Serviceable Wearing Area" in Fig. 9.

In the enlarged diagrammatic view Fig. 4 of our new cable the two strands 10 are shown as having flat outer sides 13, and because of their transverse width, will begin effective cutting as soon as the saw is started, but more rapid cutting takes place after the strands have been worn down to the dotted line circle 24ª in Fig. 4, which corresponds to the circle 24 in Fig. 9. When the strands 10 have been worn down to the inner circle 25ª, the abrasive carrying channels 15 are so small that effective cutting ceases and the cable must be discarded. In Fig. 4 the arrowed lead lines and the legend "Serviceable Wearing Area" indicate the cross sectional areas of the strands which produces rapid and effective stone cutting. It is to be noted that these cross hatched portions of the strands in Fig. 4 are substantially larger than those in Fig. 9. By actual tests we have found that a cable constructed in accordance with our invention, will cut 30 percent more hard stone such as granite per foot of wire than the old two strand round wire cable of the same size; that it will begin effective cutting from the very beginning of the use of the cable; that it will cut more uniformly throughout the useful life of the cable; and that it will have sufficient tensile strength throughout its useful life to prevent breakage. The two strands are preferably made of hard drawn abrasive resistant steel and are twisted in the manner of the prior art cables. While the cable may be formed in any suitable manner, we preferably either use the usual wire twisting machine with stationary dies of the same shape as the cross sectional shape of the strands, the latter being fed or drawn through the dies as they are drawn through the wire twisting machine, or by providing the twister head of the machine with pairs of opposed rollers having peripheral grooves shaped to the cross sectional shape of the strands to hold them with their half-round sides in contact during the twisting operation. Thus the dies or rollers will hold the outer flat portions of the strands to the outside of the twisted cable, and will cause the half-round portions of the strands to contact at the center of the cable. At intervals the twist may be reversed, as is common practice. The two strands are easy to twist and provide the maximum size spiral channels which will take coarser grains of abrasive material and effectively feed it along the cut and between the stone and the outer peripheral areas of the strands. It will be understood that the ends of a suitable length of our improved flexible cable are soldered together or otherwise joined to form the endless saw.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

We claim:

A flexible stone sawing cable composed of two spirally twisted strands of half-round and half-square wire, the two strands being of the same cross sectional size and each having flat and parallel side faces, a semi-circular inner face which merges into said side faces and forms the half-round portion of the strand and a flat outer face at right angles to said side faces and forming with the latter the half-square portion of the strand, said half-round portions of the strands being disposed at the inner part of the cable with the central portions of said semi-cylindrical faces in bearing contact along the longitudinal axis of the cable, said half-square portions of the strands being disposed at the outer part of the cable with said flat outer faces of the strands forming the peripheral portion of the cable, whereby the cable will cause effective and rapid cutting from the beginning of its use and will continue to so cut at substantially the same rate throughout its useful life.

References Cited in the file of this patent

UNITED STATES PATENTS 2,451,383   D'Avaucourt _____ Oct. 12, 1948